US008631557B2

(12) United States Patent
Elfizy et al.

(10) Patent No.: US 8,631,557 B2
(45) Date of Patent: Jan. 21, 2014

(54) LASER DRILLING METHODS OF SHALLOW-ANGLED HOLES

(75) Inventors: Amr Elfizy, Longueuil (CA); Ghislain Hardy, Ste-Julie (CA); Sylvain Cournoyer, Sorel-Tracy (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 365 days.

(21) Appl. No.: 13/185,876

(22) Filed: Jul. 19, 2011

(65) Prior Publication Data

US 2013/0020292 A1    Jan. 24, 2013

(51) Int. Cl.
| | |
|---|---|
| *B23K 26/38* | (2006.01) |
| *B23K 26/40* | (2006.01) |
| *C23C 4/18* | (2006.01) |
| *F02C 7/00* | (2006.01) |
| *F01D 25/00* | (2006.01) |

(52) U.S. Cl.
USPC ......... 29/558; 29/889; 29/889.2; 219/121.71; 416/241 R; 427/271; 427/331

(58) Field of Classification Search
USPC ........................... 29/558, 889.2, 889; 219/121.67–121.72; 416/241 R; 427/235, 271, 331
See application file for complete search history.

(56) References Cited

U.S. PATENT DOCUMENTS

| | | | |
|---|---|---|---|
| 4,756,765 A | 7/1988 | Woodroffe | |
| 5,181,379 A * | 1/1993 | Wakeman et al. | 60/766 |
| 5,216,808 A * | 6/1993 | Martus et al. | 29/889.1 |
| 5,223,692 A | 6/1993 | Lozier et al. | |
| 5,837,964 A * | 11/1998 | Emer et al. | 219/121.71 |
| 5,910,261 A | 6/1999 | Mori et al. | |
| 6,103,992 A * | 8/2000 | Noddin | 219/121.71 |
| 6,172,331 B1 | 1/2001 | Chen | |
| 6,420,677 B1 | 7/2002 | Emer et al. | |
| 6,573,474 B1 | 6/2003 | Loringer | |
| 6,663,919 B2 * | 12/2003 | Farmer et al. | 427/453 |
| 6,706,996 B2 | 3/2004 | Wybrow et al. | |
| 7,411,150 B2 | 8/2008 | Lavers et al. | |
| 7,812,282 B2 | 10/2010 | Kuhn et al. | |
| 7,816,625 B2 | 10/2010 | Beck et al. | |
| 7,820,267 B2 | 10/2010 | Fahndrich | |
| 7,837,925 B2 | 11/2010 | Le Clere | |
| 2002/0104831 A1* | 8/2002 | Chang et al. | 219/121.7 |
| 2008/0223835 A1 | 9/2008 | Kuhn et al. | |
| 2009/0001061 A1 | 1/2009 | Beck et al. | |
| 2010/0147812 A1 | 6/2010 | Beck et al. | |
| 2011/0036819 A1 | 2/2011 | Munzer et al. | |

FOREIGN PATENT DOCUMENTS

EP          0826457 A1 *   3/1998

\* cited by examiner

*Primary Examiner* — Samuel M Heinrich
(74) *Attorney, Agent, or Firm* — Norton Rose Fulbright Canada LLP

(57) ABSTRACT

A method for providing a shallow-angled hole through a thermal barrier coated component in accordance with one aspect thereof, includes a step of applying a pulse laser beam to pre-drill the hole through a base metal of the component. A thermal barrier coating is then applied to the base metal, covering the pre-drilled hole in the base metal. A further step is conducted to apply the pulse laser beam through the thermal barrier coating a location to coincide with pre-drilled hole in the base metal in order to complete the formation of the hole extending through the component.

20 Claims, 9 Drawing Sheets

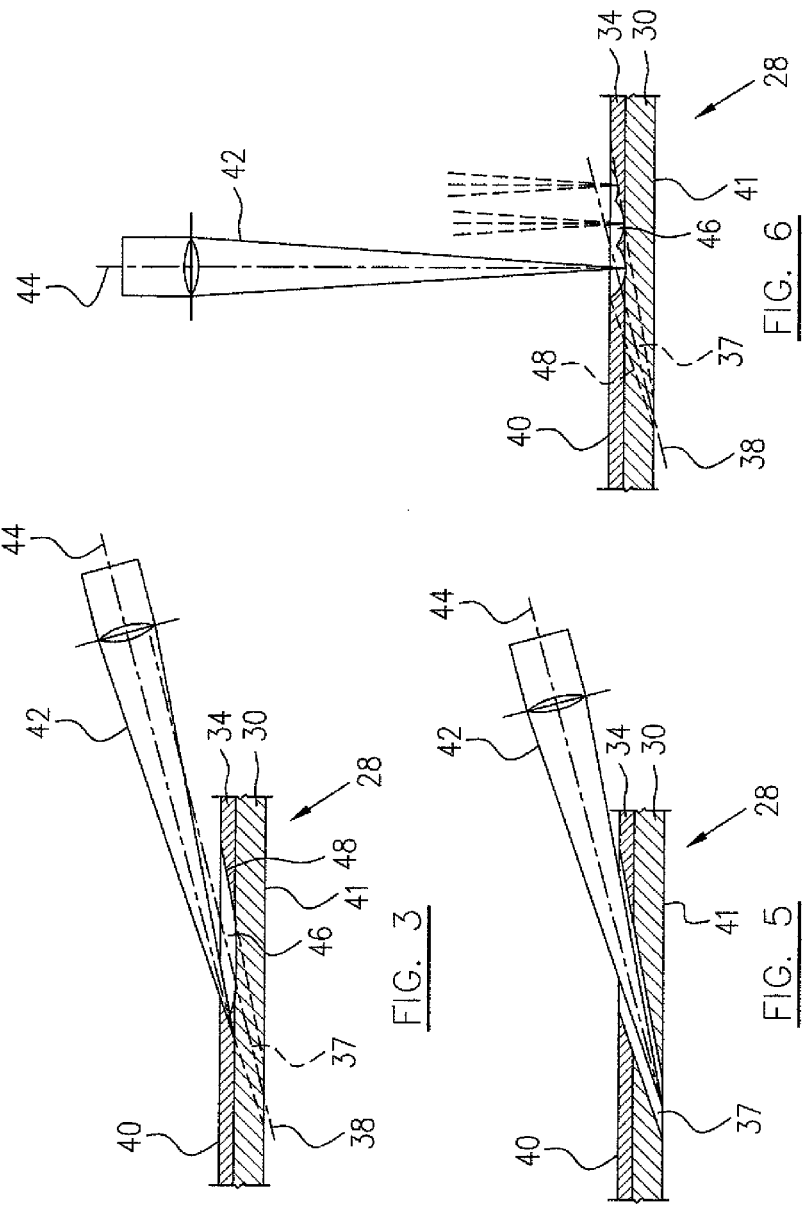

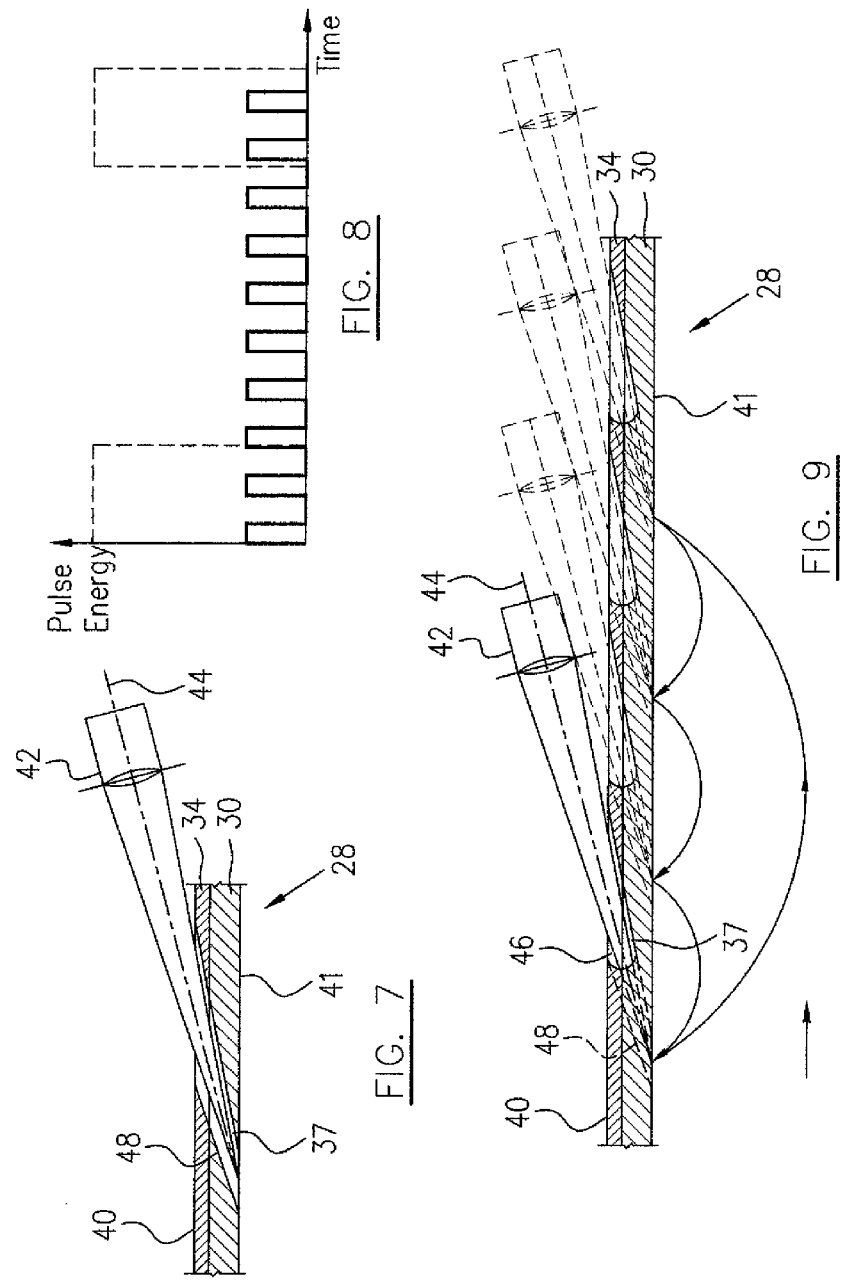

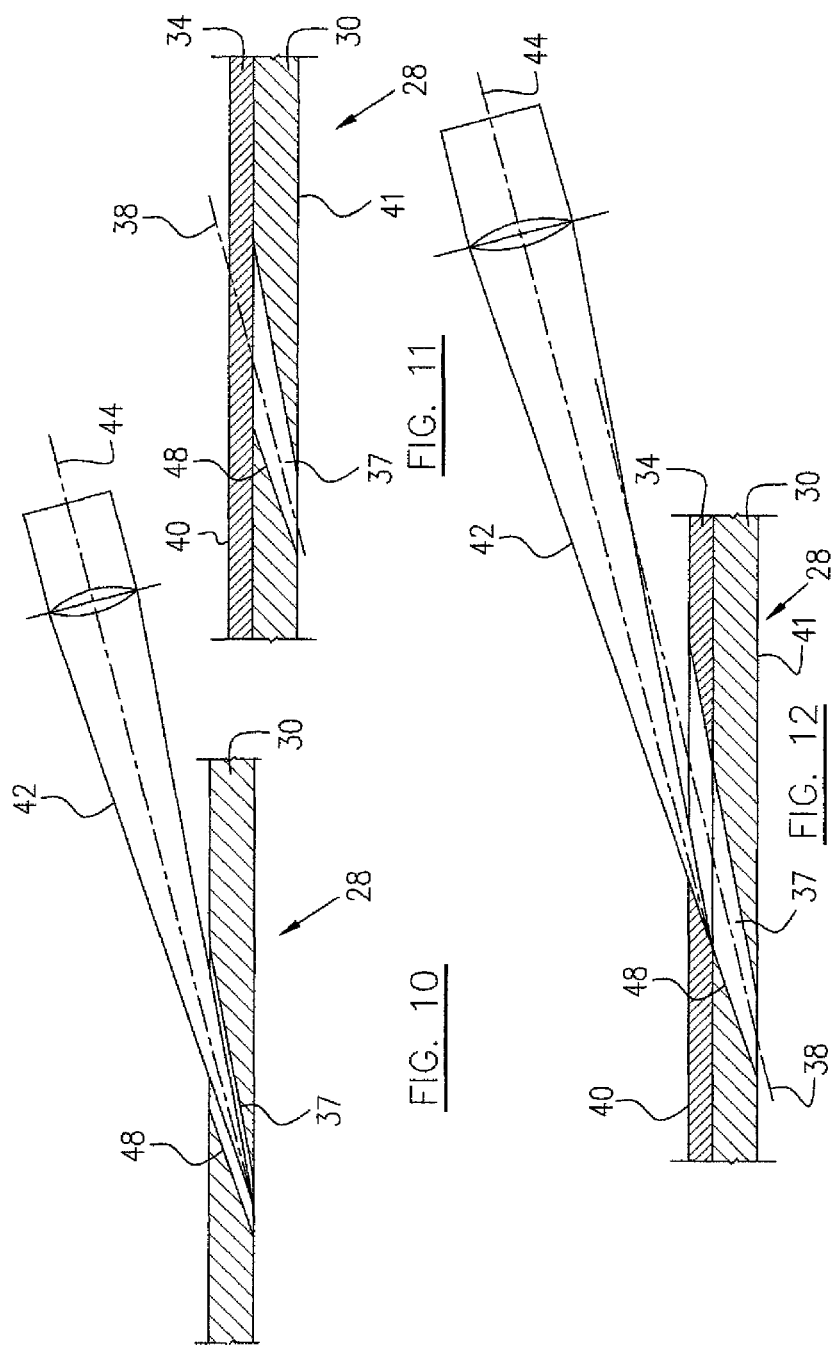

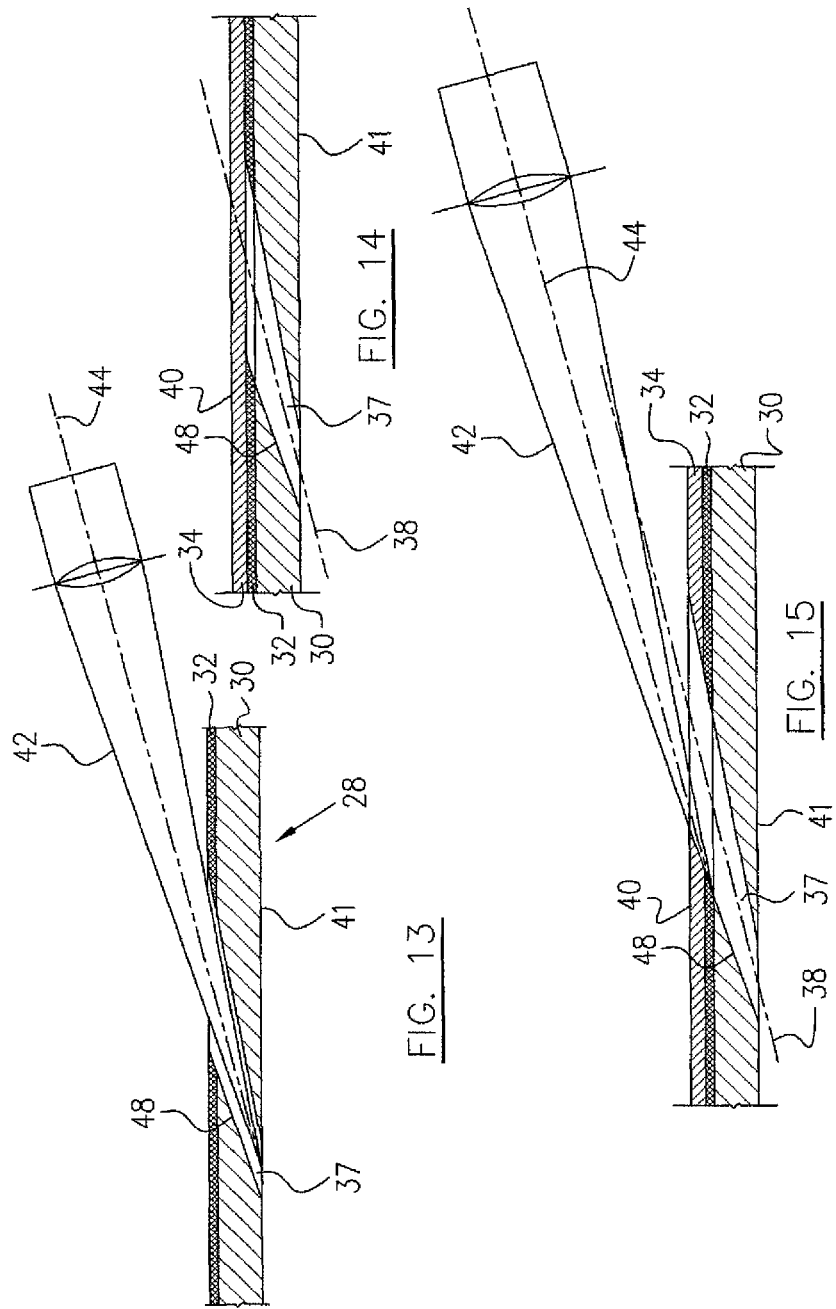

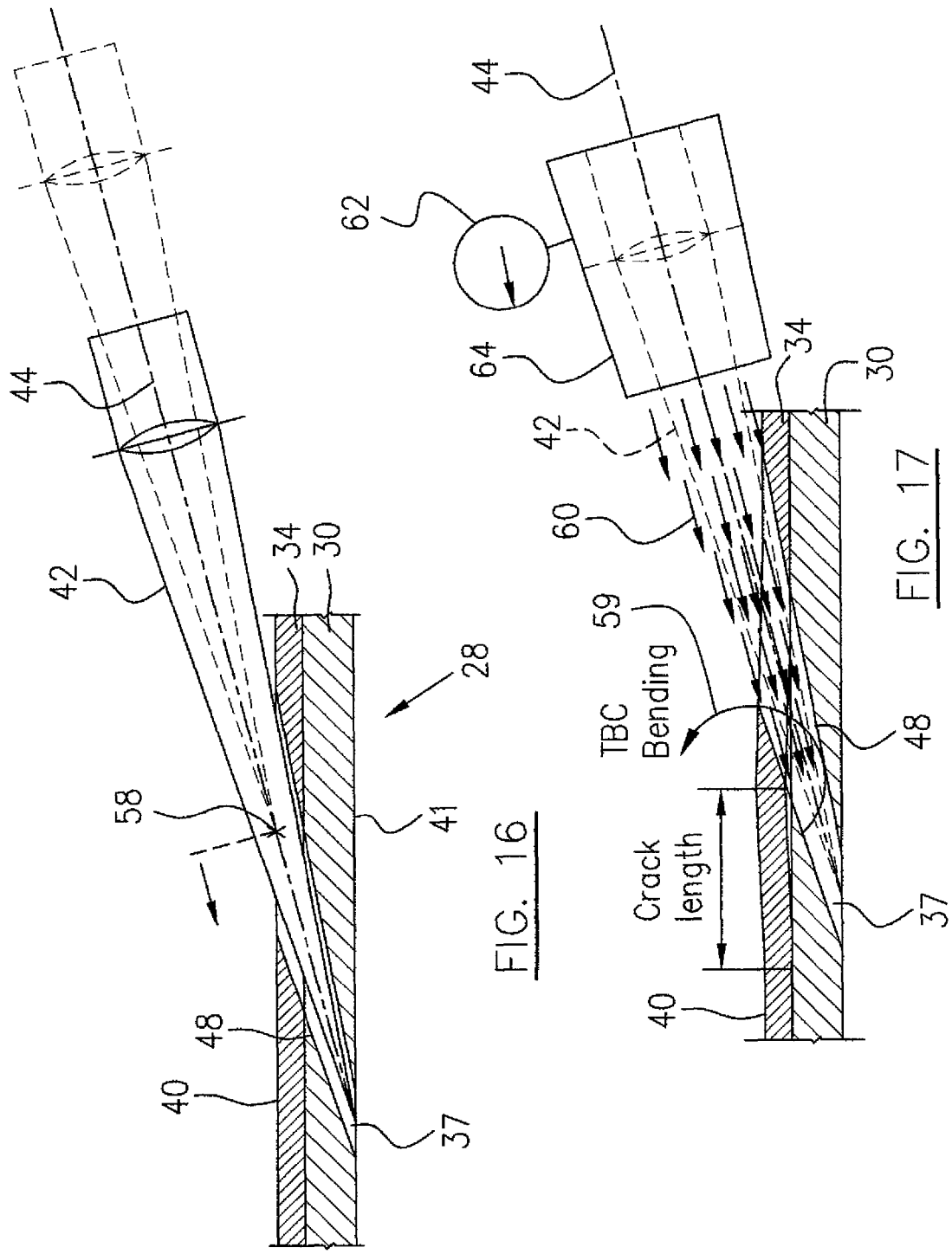

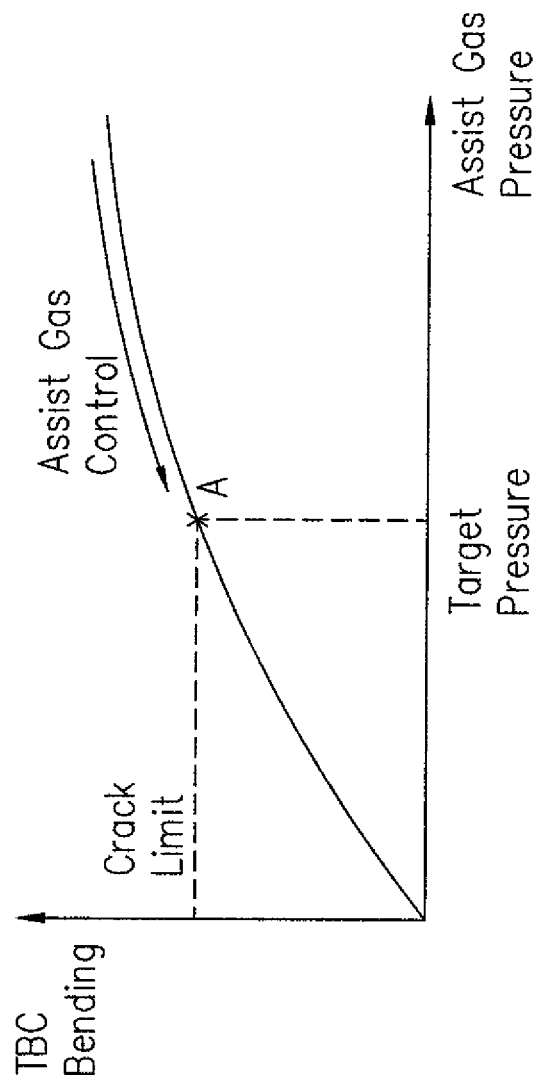

US 8,631,557 B2

LASER DRILLING METHODS OF SHALLOW-ANGLED HOLES

TECHNICAL FIELD

The described subject matter relates generally to laser drilling, and more particularly to providing shallow-angled holes in coated components.

BACKGROUND OF THE ART

Combustors of gas turbine engines are subjected to high temperatures and effusion holes can be used to direct air to cool combustor components such as combustor liner, dome and heat shield. Effusion holes extend through the component at a shallow angle with respect to the surface of the component, for efficiently cooling without risking a reduction in combustion temperature. Laser beam drilling of effusion holes in combustor components has confronted challenges. A combustor component is coated with a thermal barrier coating (TBC). Although a TBC layer is about 30% or less of, for example a heat shield thickness, it consumes more than 60% of the laser drilling energy, due to TBC properties such as heat resistance and poor thermal conductivity. Laser pulse energy is utilized to enable drilling through the TBC layer, but that laser pulse energy is too high for drilling through the base metal under the TBC, which causes excessive recast layer. The shallow angle of the effusion holes increases the distance which the laser beam has to drill through and increases the laser strike area on the component surface. This causes the intensity of the laser pulse to dissipate. Furthermore, shallow holes with an angle to the surface equal to or less than 20 degrees, may cause relatively long cracks at the interface between the TBC and the base metal. Crack length and the area subject to cracks increase as hole angle to surface decreases. Coating cracks are the main contributor to TBC spallation and chipping which risk part scrap or reduced part life in gas turbine engines.

Accordingly, there is a need to provide improvements.

SUMMARY

In one aspect, the described subject matter provides a method for making a component, the method comprising a) providing an uncoated base metal of the component; b) applying a pulse laser beam at an angle of 20 degrees or less with respect to a surface of the base metal to pre-drill at least one hole through the uncoated base metal; c) applying a bond coat to said surface of the base metal; d) applying a thermal barrier coating to coat said bond coat, the thermal barrier coating coated surface forming a top surface of the component, the thermal barrier coating substantially covering the pre-drilled hole; and then e) applying the pulse laser beam at said angle to drill through the thermal barrier coating and the bond coat coincident with the pre-drilled hole to complete the hole through the component.

In another aspect, the described subject matter provides a method for making a metal component having a plurality of holes distributed over a top surface thereof, the holes extending through a thermal barrier coating, bond coat and base metal of the component, a central axis of each of the holes extending at an angle of 20 degrees or less with respect to the top surface, the method comprising a) providing the base metal with a surface coated with the bond coat; b) applying a pulse laser beam to the coated surface of the base metal at said angle in order to pre-drill the respective holes through the bond coat and base metal; c) attaching the thermal barrier coating to the coated surface of the base metal and securing the thermal barrier coating and the base metal together with the bond coat, the thermal barrier coating forming the top surface of the component and the thermal barrier coating substantially covering the pre-drilled sections of the holes in the bond coat and base metal; and d) applying the pulse laser beam at said angle in order to drill through the thermal barrier coating in locations to re-open the respective pre-drilled holes, thereby completing formation of the holes extending through the component.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which:

FIG. 3 is a schematic cross-sectional view of a hole drilling procedure, showing a step of drilling a section of the hole within a thermal barrier coating of the combustor component;

FIG. 5 is a schematic cross-sectional view of the combustor component of FIG. 3 in the hole drilling procedure, showing a further step of drilling through the base metal of component;

FIG. 6 is a schematic cross-sectional view of a combustor component in a hole drilling procedure according to another embodiment, showing a step of perpendicularly drilling into the thermal barrier coating of the component, to partially form a section of the hole in the thermal barrier coating;

FIG. 7 is a schematic cross-sectional view of a combustor component in a hole drilling procedure according to another embodiment, showing drilling through the hole with a pulse laser beam having different laser settings for drilling through the respective thermal barrier coating and base metal;

FIG. 8 is a graphic illustration, showing the laser pulses used in the drilling procedure of FIG. 7;

FIG. 9 is a schematic cross-sectional view of a combustor component in a multiple-hole drilling procedure according to a further embodiment, showing a drilling sequence in the various locations of the holes, one laser shot at a time in each hole;

FIG. 10 is a schematic cross-sectional view of a base metal of a combustor component in a hole drilling procedure before a thermal barrier coating is attached thereon, according to a further embodiment;

FIG. 11 is a cross-sectional view of the base metal of the component of FIG. 10, showing the thermal barrier coating attached to the base metal after a section of the hole is completed through the base metal;

FIG. 12 is a schematic cross-sectional view of the combustor component of FIG. 11 in a further hole drilling stage, showing a step of drilling the thermal barrier coating to complete the hole extending through the component;

FIG. 13 is a schematic cross-sectional view of a base metal of a combustor component coated with a thin bond coat in a hole drilling procedure, before a thermal barrier coating is attached, according to a further embodiment;

FIG. 14 is a schematic cross-sectional view of the base metal of the combustor component coated with the bond coat of FIG. 13, showing a thermal barrier coating attached to the bond coat on the base metal of the component after a section of the hole has been formed in the bond coat and the base metal of the component;

FIG. 15 is a schematic cross-sectional view of the combustor component of FIG. 14 in a further step of drilling through the thermal barrier coating to complete the hole extending through the component;

FIG. 16 is a schematic cross-sectional view of a combustor component in a hole drilling procedure according to a further embodiment, showing a focal point of the pulse laser beam being continuously moved into the combustor component as each consecutive shot of the pulse laser beam is applied to the combustor component;

FIG. 17 is a schematic cross-sectional view of a combustor component in a hole drilling procedure according to a further embodiment, showing application of an assist gas jet during the laser drilling procedure; and FIG. 18 is a graphic illustration, showing a gas jet pressure control principle used in the embodiment of FIG. 17.

Figure 1:
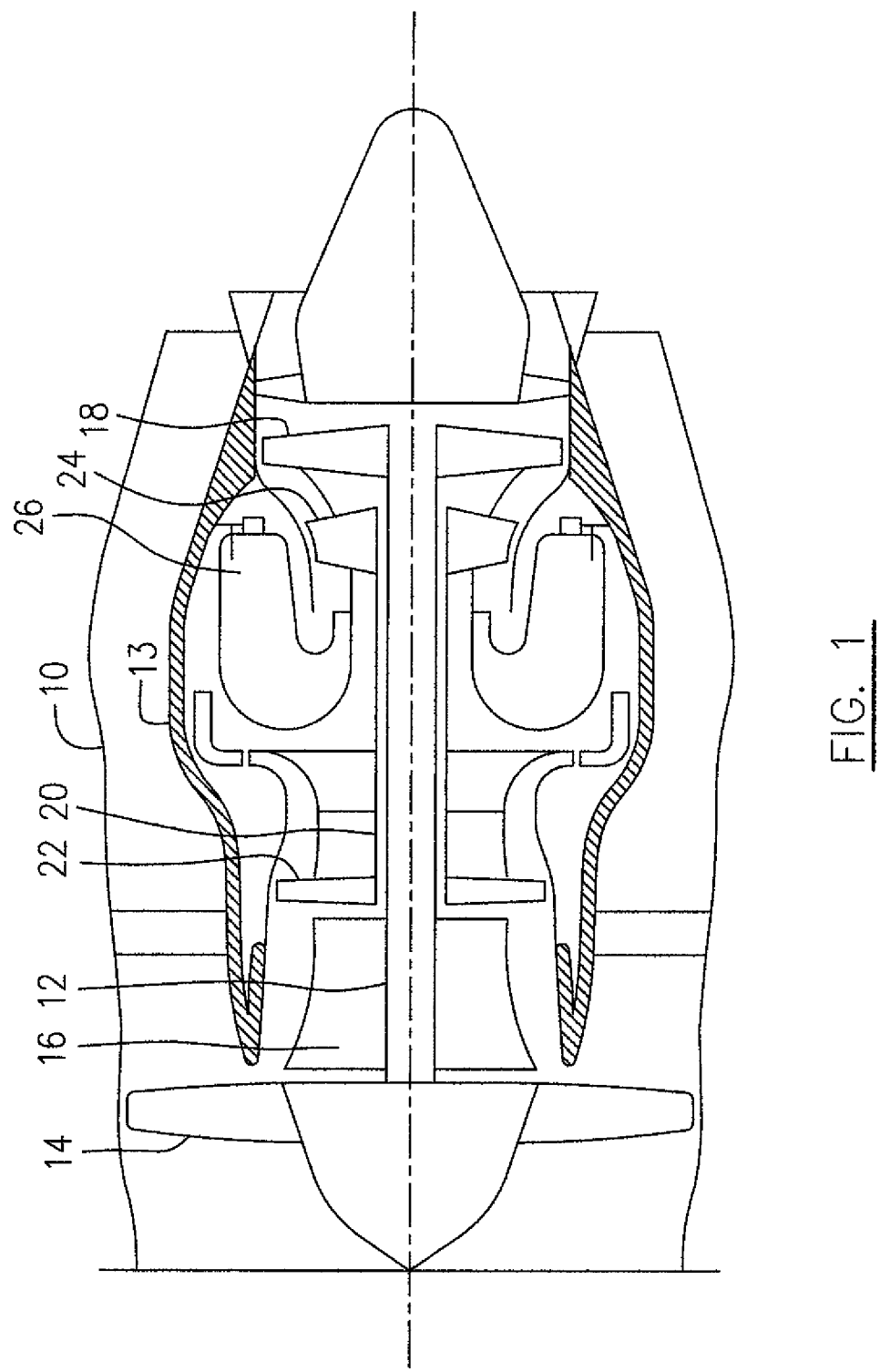
FIG. 1 is a schematic cross-sectional view of a turbofan gas turbine engine as an example illustrating an application of the described subject matter.

Further details of these and other aspects of the described subject matter will be apparent from the detailed description and drawings included below.

It will be noted that throughout the appended drawings, like features are identified by like reference numerals.

DETAILED DESCRIPTION

FIG. 1 illustrates a gas turbine engine as an example of the application of the described subject matter, which includes a housing or nacelle 10, a core casing 13, a low pressure spool assembly seen generally at 12 which includes a fan assembly 14, a low pressure compressor assembly 16 and a low pressure turbine assembly 18 and a high pressure spool assembly seen generally at 20 which includes a high pressure compressor assembly 22 and a high pressure turbine assembly 24. The core casing 13 surrounds the low and high pressure spool assemblies 12 an 20 in order to define a main fluid path (not numbered) therethrough including a combustor 26.

Figure 2:
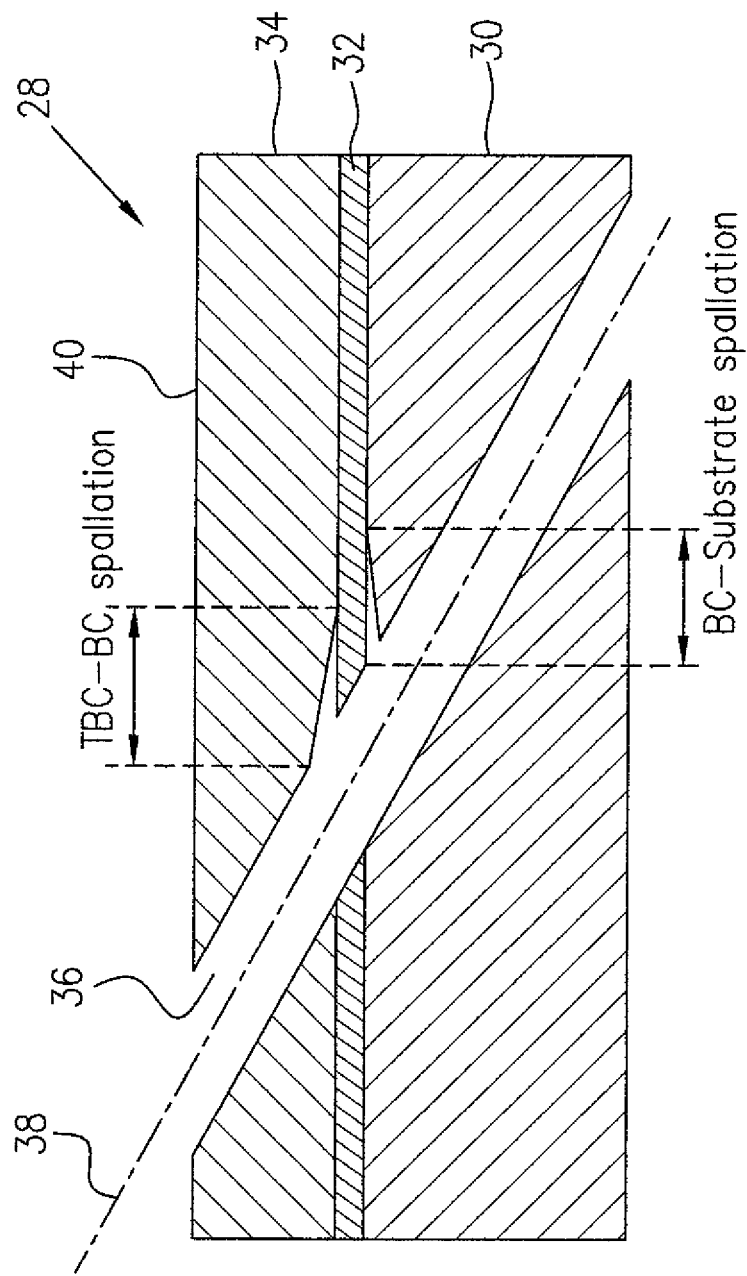
FIG. 2 is a schematic cross-sectional view of a combustor component having shallow-angled effusion holes (only one shown), used in the gas turbine engine of FIG. 1, illustrating potential spallation which is minimized in the hole drilling procedure according to the described embodiments.

The combustor 26 includes various combustor components such as liners, heat shields, etc. One combustor component 28 is shown in FIG. 2 which includes a base metal 30, as a substrate, coated with a thermal barrier coating (TBC) 34 attached thereto. The thermal barrier coating 34 and the base metal 30 are secured together, for example by a layer of bond coat (BC) 32 disposed therebetween. Effusion holes are distributed over an area of the combustor component 28. An example of one effusion hole 36 shown in the combustor component 28 is cylindrical and extends through the combustor component 28 including the thermal barrier coating 34, bond coat 32 and the base metal 30. The effusion hole 36 has a central axis 38 disposed at a non-zero shallow-angle of, for example 20 degrees or less with respect to a top surface 40 formed by the thermal barrier coating 34.

The effusion hole 36 may be formed by applying a pulse laser beam energy to the combustor component 28. As previously discussed, due to the shallow angle of the effusion holes 36 relative to the to the top surface 40 and due to the different material properties of the respective thermal barrier coating 34, bond coat 32 and the base metal 30, cracks (not numbered) may occur at the interface between the thermal barrier coating 34 and the bond coat 32 or at the interface between the bond coat 32 and the base metal 30 during a pulse laser beam drilling procedure, thereby causing TBC-BC spallation or BC-substrate spallation as shown in FIG. 2. However, the potential risks of causing cracks at the layer's interface (not numbered) during hole drilling, is minimized or eliminated in drilling procedures according to various embodiments described hereinafter.

Similar components and features in various embodiments indicated by similar numeral references will not be redundantly described.

Referring to FIGS. 3-5, an effusion hole 37 is being drilled in the combustor component 28, extending through the thermal barrier coating 34 and the base metal 30 (the bond coat therebetween is very thin and not shown). The central axis 38 of the effusion hole 37 is disposed at an angle of 20 degrees or less with respect to the top surface 40 and the hole 37 is in a truncated conical profile with a diameter diminishing as the hole 37 extends from the top surface 40 to an under surface 41 of the component 28, formed by the base metal 30. This truncated conical profiled hole 37 is provided as an example to illustrate various embodiment of laser hole drilling which are also applicable to cylindrical or other profiled holes.

In accordance with one embodiment, the hole drilling procedure includes a first step of applying a pulse laser beam 42 to drill a section 46 of the hole 37 substantially through only the thermal barrier coating 34. The laser drilling of the section 46 is completed in a trepanning concept to interpolate the laser beam within a final perimeter 48 of the hole 37.

Figure 4A:
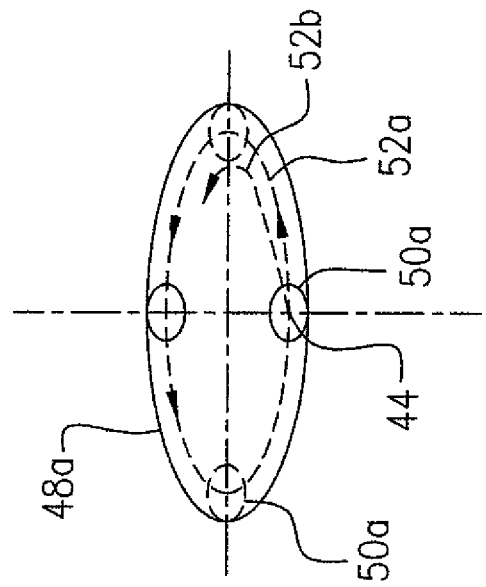
FIG. 4A is a schematic illustration of the trepanning concept used in the drilling step shown in FIG, showing a cross-section of the hole perpendicular to a central axis of the hole.
Figure 4B:
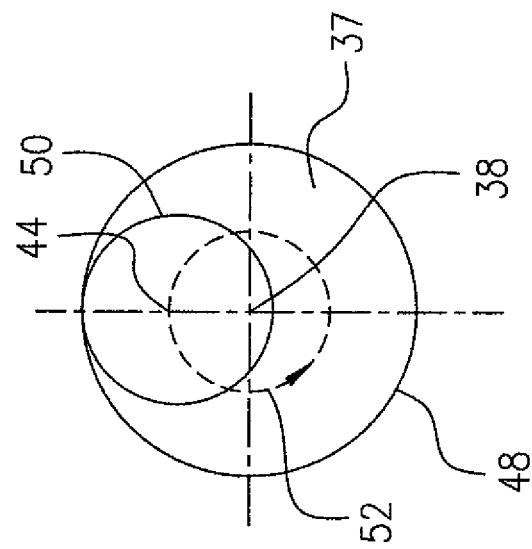
FIG. 4B is a schematic illustration of the trepanning concept used in the drilling step shown in FIG. 3, showing a boundary of the hole on a top surface of the component through which the hole extends, which is not in proportion to the illustration of FIG. 4A.

The effusion hole 37 may be in a truncated conical shape and therefore the final perimeter 48 in any cross-section thereof which is perpendicular to the central axis 38 of the hole 37, is circular as shown in FIG. 4A. However, a boundary 48a of the final perimeter 48 of the effusion hole 37 on the top surface 40 of the combustor component 28 is elliptical, as shown in FIG. 4B. A central axis 44 of the pulse laser beam 42 is disposed parallel to the central axis 38 of the effusion hole 37, that is, at the angle of the central axis 38 of the hole 37 with respect to the top surface 40. A laser drilling step for completing the section 46 of the hole 37 within the thermal barrier layer 34 is conducted by moving the central axis 44 of the pulse laser beam 42 in a circular motion 52 to confine the pulse laser beam 42 within the boundaries of the final perimeter 48 of the effusion hole 37, thereby interpolating a target spot 50 of the laser beam 42 along the final perimeter 48 of the hole 37 to complete the formation of the section 46 of the hole 37 through the thermal barrier coating 34. Nevertheless, the circular motion 52 of the central axis 44 makes an elliptical track 52a on the top surface 40 of the combustor component 28, as shown in FIG. 4B, thereby interpolating an elliptical target spot 50a along the elliptical boundary 48a of the hole 37.

The laser beam target spot 50 at this step may be set with a spot diameter smaller than the diameter of the final perimeter 48 of the effusion hole 37 at the cross-section of the hole 37, for example, a minimum diameter of the hole 37. When the target spot is relatively small as shown in FIG. 4B, the central axis 44 of the pulse laser beam 42 must be moved within the boundary 48a, following various routes, for example as indicated by arrow 52b, in order to complete the formation of the section 46 of the hole 37.

After the drilling of the section 46 of the hole 37 within the thermal barrier coating 34 is completed, the pulse laser beam 42 is further applied to drill through the base metal 30, for example, by disposing the central axis 44 of the pulse laser beam 42 at the required angle and applying shots of the pulse laser beam 42 through the completed section 42 of the hole 37 to strike the base metal 30 until the hole 37 extends through the entire component 28. The pulse laser beam 42 used in this embodiment may be set with a first pulse rate for drilling through the thermal barrier coating 34 as shown in FIG. 3 and then re-set with a second pulse rate for drilling through the base metal 30 as shown in FIG. 5. The first pulse rate may be higher than the second pulse rate. In this embodiment, the pulse laser beam 42 may also be set with a first pulse energy level for drilling through the thermal barrier coating 34 as shown in FIG. 3 and then re-set with a second pulse energy level for drilling through the base metal 30 as shown in FIG. 5. The first pulse energy level may be lower than the second pulse energy level.

The drilling steps shown in FIGS. 3-5 may be repeated at various locations over the top surface 40 of the combustor component 28 to complete the formation of other effusion holes in the combustor component 28.

The above-description does not mention a particular step of drilling through a very thin bond coat layer (not indicated in FIGS. 3-5) between the thermal barrier coating 34 and the base metal 30. In practice, the step of drilling through this thin bond coat may be included in formation of the section 46. In such a case, the trepanning formation of the section 46 of the hole 37 extends through both the thermal barrier coating 34 and an underlying thin bond coat but not into the base metal 30. Alternatively, drilling through the thin bond coat may be incorporated with the step of drilling through the base metal 30 after the section 46 of the hole 37 is formed within the thermal barrier coating 34.

The trepanning concept used in the hole drilling according to the above embodiment may also be applicable to a hole having a non-circular cross-section. The pulse laser beam 42 may have a target spot 50 or 50a having a size smaller than a minimum cross-sectional dimension of the hole and is moved to allow the target spot 50 or 50a of the laser beam 42 to move within and along the boundaries of the final perimeter 48 of the effusion hole 37. In such a case, the hole will not be a circle as shown in FIG. 4A but may have a non-circular shape. The boundary of the final perimeter of the hole on the top surface 40 of the component 28, will not be elliptical as shown in FIG. 4B, but in a closed loop in any shape. The central axis 44 of the pulse laser beam 42 will be moved therefore in a closed loop (not shown) corresponding to and within the boundary (in any shape) of the final perimeter 48 of the hole 37.

FIG. 6 shows a combustor component similar to that of FIGS. 3 and 5, in a hole drilling procedure according to another embodiment. Instead of drilling through the thermal barrier coating 34 in a trepanning concept as shown in FIG. 3, the step of drilling through only the thermal barrier coating 34 according to this embodiment is conducted by drilling in a perpendicular direction with respect to the top surface 40 of the combustor component 28 in order to remove material of the thermal barrier coating 34 within the boundaries of the final perimeter 48 of the effusion hole 37. This drilling in the perpendicular direction may be conducted one or more times at different locations within a boundary of the final perimeter 48 of the effusion hole 37 on the top surface 40 of the combustor component 28, each perpendicular drilling is conducted to a depth not greater than a thickness of the thermal barrier coating or not greater than a sum of the thickness of the thermal barrier coating 34 and a bond coat (not indicated) attached to the under surface of the thermal barrier coating 34. It should be understood that the depth of each perpendicular drilling in the different locations may vary in order to prevent extending beyond the final perimeter 48 of the effusion hole 37, as shown in FIG. 6.

The perpendicular drilling however, may not be enabled to remove all of the thermal barrier coating material within the boundaries of the final perimeter 48 of the hole and thus the perpendicular drilling procedure results in a partial formation of the section 46 extending through the thermal barrier coating 34, or through both the thermal barrier coating 34 the thin bond coat, leaving residual coating material within the final perimeter 48 of the effusion hole 37. The residual coating material within the final perimeter 48 of the effusion hole 37 is removed in a further step by applying the pulse laser beam 32 at the angle of the hole, through the partially completed section 48 of the effusion hole 37 to drill through the thermal barrier coating 34, the thin bond coat and the base metal 30 in order to complete formation of the effusion hole 37 extending through the entire combustor component 28. This step is similar to the step in the previous embodiment with reference to FIG. 5 and will not be repeated in detail.

It should be understood that perpendicular drilling through the thermal barrier coating 34 removes relatively more material of the thermal material coating 34 and leaves less residual material within the final perimeter 48 of the effusion hole 37 if the laser beam 42 is set with a target spot having a relatively smaller size and if the laser beam 42 is applied to relatively more drilling locations within the boundary of the final perimeter 48 on the top surface 40 of the combustor component 28. Therefore, it may be desirable to use a pulse laser beam 42 with a target spot having a size smaller than, for example a diameter of the effusion hole 37 in any completely circular cross-section perpendicular to the central axis 38 of the hole, or smaller than a minimum cross-sectional dimension of the effusion hole 27 in the case that the cross-sectional shape of the effusion hole 37 is not circular.

Similar to the previous embodiment, the laser beam 42 used in this embodiment may also have different settings for drilling through the different layers of the combustor component 28, which will not be repeated herein.

Referring to FIGS. 7 and 8, another embodiment of the hole drilling procedure is described. The steps of drilling through the respective thermal barrier coating 34 and base metal 30 in this embodiment may not necessarily change drilling methods and therefore may be conducted in one method, for example by disposing the central axis 44 of the pulse laser beam 42 at the shallow angle of the effusion hole 37 relative to the top surface 40 and applying shots of the pulse laser beam 42 to strike the thermal barrier coating 34 and then the base metal 30 in order to complete formation of the hole extending through the combustor component 28. Nevertheless, the settings of the pulse laser beam 42 differ between drilling through the respective thermal barrier coating 34 and drilling through the base metal 30.

The pulse laser beam 42 is set with a first pulse frequency rate and a first pulse energy level to drill a section of the effusion hole 37 through the thermal barrier coating 34 only. The pulse laser beam 42 is then re-set with a second pulse frequency rate and a second pulse energy level to drill through the base metal 30 in order to complete formation of the effusion hole 37 extending through the combustor component 28. The first pulse frequency rate is higher than the second pulse frequency rate and the first pulse energy level is lower than the second pulse energy level.

Drilling through a thin bond coat (not indicated in FIG. 7) between the thermal barrier coating 34 and the base material 30 may be conducted together with the step of drilling through the thermal barrier coating 34 or with the step of drilling through the base metal 30.

It should be understood that the principle of different laser settings suitable for different materials of the thermal barrier coating and base metal may be combined with different laser drilling methods for drilling through the respective thermal barrier coating 34 and base metal 30. Examples of such combinations are described above with reference to previously described embodiments. Such combinations will be applicable in further embodiments described hereinafter.

The pulses of the pulse laser beam 42 which has the relatively high pulse frequency rate and low pulse energy level, is shown in solid lines in FIG. 8 and in comparison, the pulses of the pulse laser beam 42 which has the relatively low pulse frequency rate and higher pulse energy level, is shown in broken lines in FIG. 8. The relatively high pulse frequency rate as shown in the solid line, may be in a range between 50 Hz and 100 Hz.

Referring to FIG. 9, the combustor component 28 is shown in a multiple hole drilling procedure according to a further embodiment. As previously described, a combustor component such as a liner, heat shield, etc. includes a plurality of effusion holes 37, for example four effusion holes 37 are shown in FIG. 9. In the previously described embodiments, only one of the effusion holes in the combustor component 28 is shown. It should be understood that the procedures of the previously described embodiments are conducted by completing drilling of one effusion hole 37 before drilling of another effusion hole 37 is begun. Therefore, the formation of the respective effusion holes 37 in a single combustor component 28 is achieved one after another.

The multiple hole drilling procedure according to this embodiment is however conducted by applying a single shot of the pulse laser beam 42 to strike the thermal barrier coating 34 once a time at each location of the effusion holes 37 in a selected sequence, for example as shown by the arrows in FIG. 9, thereby removing a volume of the coating material at each location of the effusion holes 37 until a first round of single shots of the pulse laser beam 42 to the thermal barrier coating 34 over every location of the effusion holes 37 is completed. A second round of single shots of the laser beam 42 is then applied to each location of the effusion holes 37 in a sequence which may be the same or different from the sequence of the first round of the single, shots of the pulse laser beam 42, to strike the thermal barrier coating 34 within the boundaries of the final perimeter 48 of each effusion hole 37 being drilled. After a number of rounds of single shots of the pulse laser beam 42 to the thermal barrier coating 34 in each location of the effusion holes 37, a section 46 of each of the effusion holes 37 has been at least partially drilled through the thermal barrier coating 34 to expose the bond coat and/or base metal 30. These steps are then repeated to drill deeper into the materials of the combustor component 28 including the base metal 30, within the boundaries of the final perimeters 48 of the respective effusion holes 37 being drilled, until formation of all the effusion holes 37 is completed.

In contrast to the hole drilling procedures of previous embodiments in which the formation of a plurality of effusion holes 37 in the combustor component 28 is completed by completing the drilling of one hole before beginning the drilling of another hole, the completion of all of the effusion holes 37 in the combustor component 28 in this embodiment is completed when the final round of single shots of the pulse laser beam 42 to every location of the effusion holes 37, is completed. Therefore, the formation of all the respective effusion holes 37 in the combustor component 28 is completed at substantially the same time.

According to this embodiment, completion of each effusion hole 37 takes much longer time in contrast to the time for completion of each effusion hole 37 in the previous embodiments, and the laser beam 42 does not immediately follow a previous shot of the pulse laser beam 42 applied to the same location of the effusion hole 37. This allows cooling of the combustor component material in a local area around each effusion hole 37, before the next laser shot (in the next round of laser beam shots) is applied to the same effusion hole 37. It also improves the heat gradient across the combustor component which reduces the chances of coating cracks. This may improve the formation quality of the effusion holes being drilled and may allow use of a higher pulse energy level of the laser beam because of the increased cooling time between laser beam shots in the same hole and the improved heat gradient, resulting in a more efficient drilling process.

Optionally, this embodiment can be combined with the previous described embodiment illustrated in FIGS. 7 and 8 to set the pulse laser beam 42 with the relatively high pulse frequency rate and relatively low pulse energy level as shown by solid lines in FIG. 8, to be used in a few initial rounds of the single shots of the pulse laser beam to drill through the thermal barrier coating 34 and/or bond coat (not indicated in FIG. 9) in respective locations of the effusion holes 37. The pulse laser beam can then be reset with the relatively low pulse frequency rate and relatively high pulse laser energy levels as shown by broken lines in FIG. 8, to be used in following rounds of the single shots of the pulse laser beams one shot a time to the base metal 30 of the effusion holes 37.

Referring to FIGS. 10-12, the formation of a plurality of shallow angled effusion holes 37 (only one shown) distributed over the top surface 40 of the combustor component 28 according to this embodiment, begins with providing the base metal 30 in an uncoated condition as shown in FIG. 10. The pulse laser beam 42 is applied at the desired angle to individual locations of the respective effusion holes 37 in the base metal 30 in order to pre-drill a section of the respective effusion holes 37 through the uncoated base metal 30. The next step is to attach the thermal barrier coating 34 onto the top surface (not numbered) of the uncoated base metal 38 with the bond coat (not indicated) disposed therebetween in order to secure the thermal barrier coating 34 and the base metal 30 together, as shown in FIG. 11. Therefore, the thermal barrier coating 34 forms the top surface 40 of the combustor component 28. The bond coat between the thermal barrier coating 34 and the base metal 30 may or may not cover the pre-drilled section of the effusion holes 37 in the base metal 30. The bond coat may be applied to the top surface of the base metal 30 or may be applied to an under face of the thermal barrier coating 34, after pre-drilling of the section of the respective effusion holes 37 through the base metal 30 is completed, but immediately before attachment of the thermal barrier coating 34 to the base metal 30.

The last step of this embodiment as illustrated in FIG. 12, is to apply the pulse laser beam 42 at the angle of the effusion holes 37 to various locations in the thermal barrier coating 34 in order to drill through the thermal barrier coating 34 and the bond coat into the pre-drilled sections of the respective effusion holes 37, thereby reopening the pre-drilled sections of the hole 37 and completing formation of the effusion holes 37 extending through the combustor component 28.

This embodiment may be combined in various ways with the previously described embodiments. For example, different settings of the pulse frequency rate and pulse energy level may be used for the respective pre-drilling step of drilling through the uncoated base metal 30 and for the final drilling step of drilling through the thermal barrier coating 34. Different drilling methods may also be applied to the respective pre-drilling step and the final drilling step, such as drilling in a trepanning concept, or applying a single shot of the pulse laser beam 42 in each location of the effusion holes 37, in repeated round of laser beam shots.

FIGS. 13-15 show an embodiment similar to the previously described embodiment as shown in FIGS. 10-12. The difference between the two embodiments lies in that the pre-drilling step begins with providing the base metal 30 with a surface coated with the bond coat 32 as shown in FIG. 13, rather than the uncoated base metal 30 in FIG. 10. Therefore, the pulse laser beam 42 in this embodiment is applied at the desired angle in various locations of the effusion holes 37 to the bond coat 32 covering a surface (not numbered) of the base metal 30, to pre-drill the section (not numbered) of the respective effusion holes 37 extending through the bond coat 32 and the base metal 30 as shown in FIG. 13. The thermal barrier coating 34 is then attached to the surface of the base metal 30 covered by the bond coat 32, as shown in FIG. 14. The final drilling step is to apply the pulse laser beam 42 at the angle of the effusion holes 37 to drill through the thermal barrier coating 34 at various locations in the thermal barrier coating 34 into the pre-drilled sections of the respective effusion holes 37 in the bond coat 32 and base metal 30, thereby re-opening the pre-drilled sections of the respective effusion holes 37 and completing formation of the effusion holes 37 extending through the combustor component 28, as shown in FIG. 15.

It should be noted that the attachment of the thermal barrier coating 34 to the uncoated base metal 30 or to the surface of the base metal 30 covered by the bond coat 32 in these two embodiments, should be conducted only after the pre-drilled sections of all the diffusion holes 37 through the uncoated base metal 30 or through the bond coat 32 and base metal 30 of the combustor component 28 are completed.

Optionally, a cleaning step may be desirable before attachment of the thermal barrier coating 34 to the uncoated base metal 30 or to the surface of the base metal 30 covered by the bond coat 32 in these two embodiments, in order to provide a clean surface of the uncoated base metal 30 or the coated base metal 30 after the pre-drilling procedure, in order to improve the quality of attachment of the thermal barrier coating 34 to the uncoated base metal 30 or the coated base metal 30. The cleaning step may be conducted for example, by using pressurized gas jets which may be available in a laser drilling procedure, as will be further described hereinafter.

It should be noted that after attachment of the thermal barrier coating 34 to the uncoated or coated base metal 30, the pre-drilled sections of the respective effusion holes 37 are not visible from the side of the combustor component 28 attached with the thermal barrier coating. Optionally, a step of probing and/or scanning the combustor component 28 which as the pre-drilled sections of the effusion holes 27 covered by the attached thermal barrier coating 34, as shown in FIGS. 11 and 14, may be conducted in order to accurately locate the positioned of the pre-drilled sections in the combustor component 28, thereby ensuring alignment of the pulse laser beam 42 with the pre-drilled section of the effusion holes 37 in the following re-opening drilling step.

In FIG. 16, the effusion holes 37 (only one shown) in the combustor component 28 are shown in a drilling procedure according to a further embodiment. The pulse laser beam 42 is set with a laser focal point 58 located at the top surface 40 of the combustor component 28 in order to apply a first shot of the pulse laser beam 42 to strike the thermal barrier coating 34 at a location of one of the effusion holes 37 in the combustor component 28, thereby removing a volume of the thermal barrier coating material 34. Further shots of the pulse laser beam 42 are applied to the location of this one effusion hole 37 to strike the thermal barrier coating 34 and/or bond coat (not indicated) to further remove the thermal barrier material and/or bond coat material, with the laser focal point 58 being moved closer to the under surface 41 of the combustor component 28 with each consecutive shot, as indicated by the arrow in FIG. 16. The process of drilling by applying shots of the pulse laser beam 42 with the laser focal point 58 being moved deeper into the effusion hole 37 with each consecutive shot, may be conducted repeatedly to complete the formation of this effusion hole 37 extending through the combustor component 28. The remaining effusion holes 37 in the combustor component 28 may be completed one after another in a similar procedure as described above.

Alternatively, the drilling procedure of by applying shots of the pulse laser beam 42 with the laser focal point 58 being moved deeper within the effusion hole 37 with each consecutive shot, may continue until a section of the effusion hole 37 extends through the thermal barrier coating 34 and the bond coat. The further drilling through the base metal 30 may be conducted otherwise, for example by using the methods described in previous embodiments.

Referring to FIGS. 17 and 18, an assist gas jet such as pressurized nitrogen gas may be used in a laser drilling procedure, thereby facilitating the laser drilling procedure. The assist gas jet, as indicated by arrows 60 is injected into the respective effusion holes 37 being drilled during the pulse laser beam drilling procedure, substantially in the direction of the central axis 44 of the pulse laser beam 42.

When a section of the effusion hole 37 is being drilled through the thermal barrier coating 34 and into the base metal 30, the assist gas jet 60 under high pressure and at high velocity will create a bending moment on the thermal barrier coating, as indicated by arrow 59 in FIG. 17. This bending moment 59 may however cause substantial cracks in the interface between the thermal barrier coating 34 and the base metal 30, resulting in TBC-BC spallation and/or BC-substrate spallation as shown in FIG. 2. The graphical illustration of FIG. 18 generally shows the relationship between the pressure of the assist gas jet (Assist Gas Pressure) which determines the velocity of the assist gas jet accordingly and the bending moment (TBC Bending) acting on the thermal barrier coating 34. Point A in the graphic illustration represents a bending moment value of crack limit when the pressure of the assist gas jet reaches a target pressure. Crack occurrence begins when the bending moment value of crack limit is achieved. The target pressure value of the pressure of the assist gas jet according to an embodiment of the laser drilling procedure, must be determined. The pressure of the assist gas jet is then adjusted such that the assist gas jet 60 is injected into the respective effusion holes 37 being drilled under a gas pressure which is lower than the determined target pressure value in order to avoid the occurrence of cracks in the interface between the thermal barrier coating 34 and the base metal 30. The gas pressure of the assist gas jet 60 may be measured by a gas meter 62 at a gas jet nozzle 64 which injects the assist gas jet 60.

Alternatively, the velocity of the assist gas jet 60 being injected into the respective effusion holes 37, may be adjusted to be lower than a predetermined value corresponding to the target pressure value of the assist gas jet 60, for example lower than 100 psi, thereby limiting the bending moment 59 of the assist gas jet 60 acting on the thermal barrier coating 34 in order to avoid the occurrence of cracks in the interface between the thermal barrier coating 34 and the base metal 30.

The embodiments of controlling an assist gas jet used in a laser drilling procedure to avoid the occurrence of cracks between the thermal barrier coating 34 and the base metal 30 are optionally combinable with any embodiments of the laser hole drilling procedures described in the previously described embodiments.

The described embodiments of the laser hole drilling procedure may be combined in any desired combinations to best fit into the manufacturing procedures of various combustor components in different types of gas turbine engines, and need not be limited to the turbofan gas turbine engine as exemplarily illustrated in the drawings and described above.

The above description is meant to be exemplary only, and one skilled in the art will recognize that changes may be made to the embodiments described without departure from the scope of the described subject matter. For example, cylindrical and truncated conical effusion holes are provided as examples to illustrate the principle of the laser hole drilling procedure according to various embodiments of the described subject matter. However, the described laser hole drilling procedures in the various embodiments are applicable for drilling effusion holes in various combustor components having a profile other than cylindrical or truncated conical. The described laser hole drilling procedures in the various embodiments are also applicable for drilling effusion holes in a combustor component which has a thermal barrier coating coated directly on a surface of a base metal without a bond coat therebetween. The described laser hole drilling procedures in the various embodiments are also applicable to any components having a thermal barrier coating other than combustor components to drill shallow-angled holes therethrough. Still other modifications which fall within the scope of the described subject matter will be apparent to those skilled in the art, in light of a review of this disclosure, and such modifications are intended to fall within the appended claims.

The invention claimed is:

1. A method for making a component, the method comprising:
   a) providing an uncoated base metal of the component;
   b) applying a pulse laser beam at an angle of 20 degrees or less with respect to a surface of the base metal to pre-drill at least one hole through the uncoated base metal;
   c) applying a bond coat to said surface of the base metal;
   d) applying a thermal barrier coating to coat said bond coat, the thermal barrier coating coated surface forming a top surface of the component, the thermal barrier coating substantially covering the pre-drilled hole; and then
   e) applying the pulse laser beam at said angle to drill through the thermal barrier coating and the bond coat coincident with the pre-drilled hole to complete the hole through the component.

2. The method as defined in claim 1 further comprising prior to step (b), setting the pulse laser beam with a first set of parameters optimized for drilling through the uncoated base metal and prior to step (e), resetting the pulse laser beam with a second set of parameters optimized for drilling through the thermal barrier coating.

3. The method as defined in claim 1 further comprising cleaning said surface of the uncoated base metal between steps (b) and (c).

4. The method as defined in claim 1 wherein step (e) is conducted by applying the pulse laser beam to remove materials of the thermal barrier coating and bond coat in a trepanning concept to interpolate the laser beam within a final perimeter of the respective holes.

5. The method as defined in claim 4 wherein step (e) is conducted by moving a central axis of the pulse laser beam in a closed loop defined on the top surface of the component, the closed loop confining the laser beam within the final perimeter of the respective holes.

6. The method as defined in claim 4 wherein in step (e) the pulse laser beam is set with a spot size smaller than a minimum cross-sectional dimension of the respective holes.

7. The method as defined in claim 1 wherein step (b) is conducted by applying shots of the pulse laser beam to strike the base metal.

8. The method as defined in claim 1 wherein step (e) is conducted by applying shots of the pulse laser beam to strike the thermal barrier coating and the bond coat, respectively.

9. The method as defined in claim 1 further comprising a step of probing the component after step (d) to locate the pre-drilled hole in the component, thereby ensuring alignment of the pulse laser beam with the pre-drilled hole made in step (b).

10. A method for making a metal component having a plurality of holes distributed over a top surface thereof, the holes extending through a thermal barrier coating, bond coat and base metal of the component, a central axis of each of the holes extending at an angle of 20 degrees or less with respect to the top surface, the method comprising:
    a) providing the base metal with a surface coated with the bond coat;
    b) applying a pulse laser beam to the coated surface of the base metal at said angle in order to pre-drill the respective holes through the bond coat and base metal;
    c) attaching the thermal barrier coating to the coated surface of the base metal and securing the thermal barrier coating and the base metal together with the bond coat, the thermal barrier coating forming the top surface of the component and the thermal barrier coating substantially covering the pre-drilled sections of the holes in the bond coat and base metal; and
    d) applying the pulse laser beam at said angle in order to drill through the thermal barrier coating in locations to re-open the respective pre-drilled holes, thereby completing formation of the holes extending through the component.

11. The method as defined in claim 10 further comprising prior to step (b), setting the pulse laser beam with a first set of parameters optimized for drilling through the base metal, and prior to step (d), resetting the pulse laser beam with a second set of parameters optimized for drilling through the thermal barrier coating.

12. The method as defined in claim 10 further comprising cleaning the coated surface of the base metal between steps (b) and (c).

13. The method as defined in claim 10 wherein step (d) is conducted by applying the pulse laser beam to remove materials of the thermal barrier coating in a trepanning concept to interpolate the laser beam within a final perimeter of the respective holes.

14. The method as defined in claim 13 wherein step (d) is conducted by moving a central axis of the pulse laser beam in a closed loop defined on the top surface of the component, the closed loop confining the laser beam within the final perimeter of the respective holes.

15. The method as defined in claim 13 wherein in step (d) the pulse laser beam is set with a spot size smaller than a minimum dimension of the respective holes.

16. The method as defined in claim 10 wherein step (b) is conducted by applying shots of the pulse laser beam to strike the bond coat and base metal.

17. The method as defined in claim 10 wherein step (d) is conducted by applying shots of the pulse laser beam to strike the thermal barrier coating.

18. The method as defined in claim 10 further comprising a step of probing and scanning the component after step (c) to locate the respective pre-drilled holes in the component, thereby ensuring alignment of the pulse laser beam with the respective pre-drilled holes made in step (d).

19. The method as defined in claim 10 comprising:
   determining a gas pressure value at which injection of an assist gas jet into one of the holes being drilled in step (d) causes a beginning of a crack occurrence in the interface between the thermal barrier coating and the base metal; and
   injecting the assist gas jet under a gas pressure into the respective holes being drilled during the pulse laser beam drilling, the gas pressure being lower than the determined gas pressure value when step (d) is conducted, in order to avoid occurrence of cracks in the interface between the thermal barrier coating and the base metal.

20. The method as defined in claim 19 wherein the gas pressure is measured within a gas jet nozzle injecting the assist gas jet.

* * * * *